Patented June 24, 1930

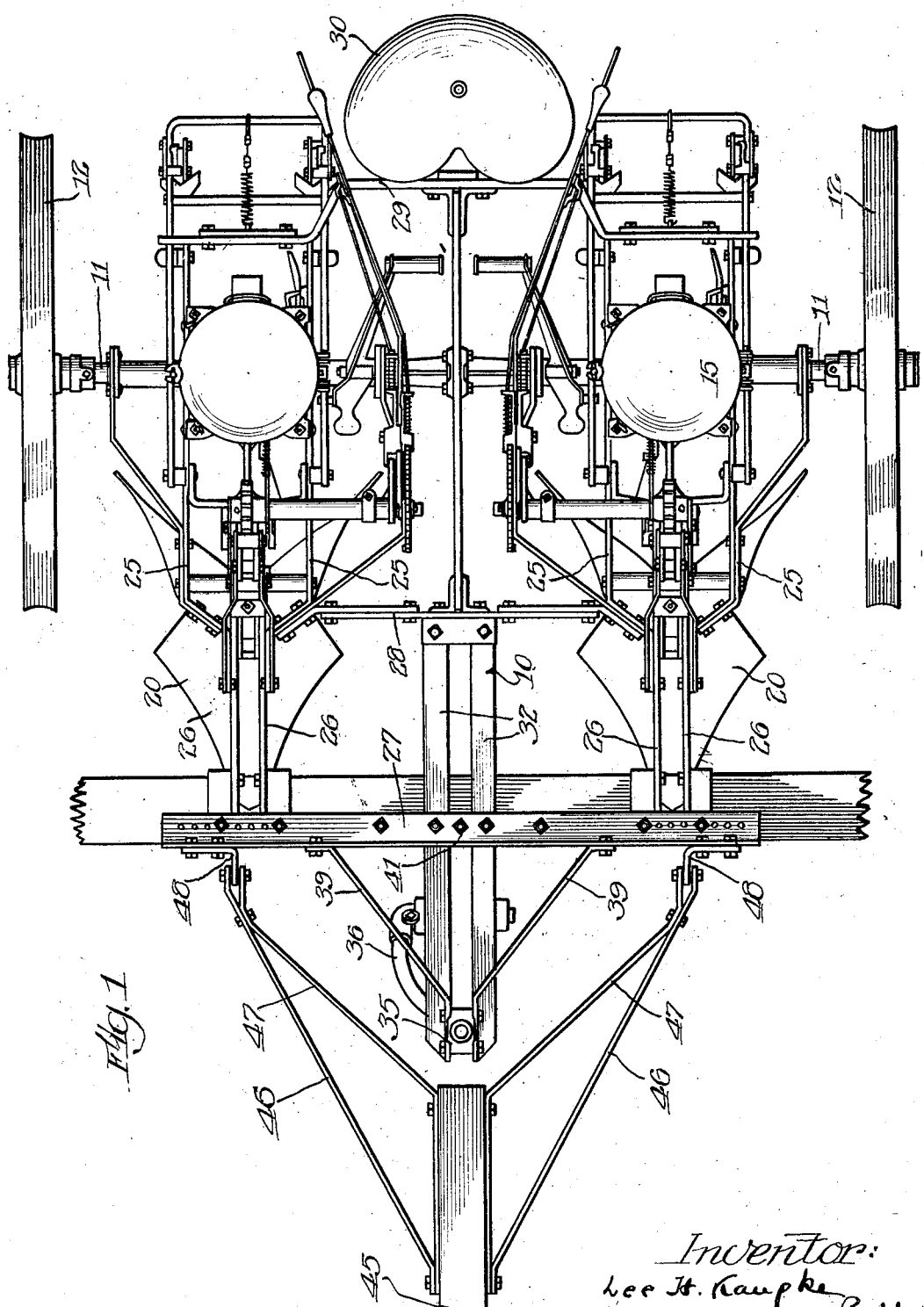

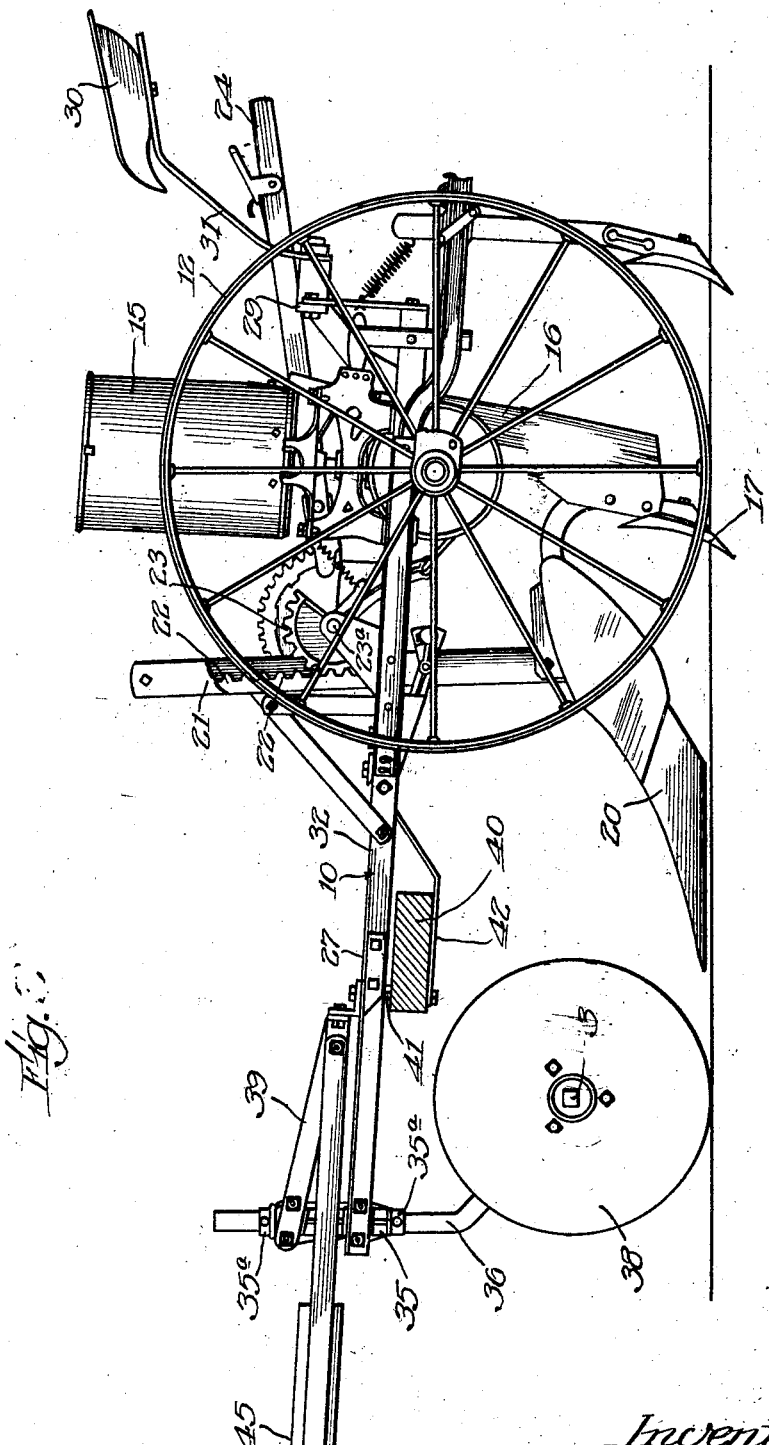

1,767,853

UNITED STATES PATENT OFFICE

LEE H. KAUPKE, OF ROCK ISLAND, ILLINOIS, ASSIGNOR TO ROCK ISLAND PLOW COMPANY, OF ROCK ISLAND, ILLINOIS, A CORPORATION OF ILLINOIS

TWO-ROW PLANTER

Application filed June 22, 1925. Serial No. 38,607.

This invention relates to improvements in planters, and more particularly to planters of the two-row type especially adapted for planting corn and cotton.

Planters of the above type are extensively used in many localities, being preferable over a single row planter on account of the greater economy in speed and labor in planting two rows in one operation. Such planters are mounted on a wheeled frame and provided with two planting mechanisms arranged side by side and the proper distance apart, the whole being usually drawn by four or more horses through a medium of a transversely disposed evener bar of the usual form.

As heretofore constructed, planters of this type have usually been provided with two main supporting wheels arranged with their axes substantially in transverse alignment with the planting mechanism and with the two bottoms or sweeps arranged forwardly of the axes of said supporting wheel. This general arrangement necessitates the carrying of a portion of the weight of the planter frame and sweeps by the horses.

The principal object of my invention is to provide in combination with a two row planter of the character described an improved form of fore-carriage or tongue truck arranged forwardly and centrally of the frame and adapted to provide auxiliary support for the frame and evener bar. A further object is to provide an improved arrangement of fore-carriage and tongue attachment whereby the planter may be steadied during its forward movement.

Other objects of invention will appear from time to time as the following description proceeds.

The invention may best be understood by reference to the accompanying drawings in which Figure 1 is a top plan view of a planter constructed in accordance with my invention, with the end portions of the evener bar and pole broken away.

Figure 2 is a side view of the planter shown in Figure 1.

Referring now to details of the apparatus shown in the drawings the planter is provided with a main frame indicated generally by the numeral 10 and having axles 11—11 provided with supporting wheels 12—12 at opposite sides of the main frame. In the form shown the axles 11—11 are continuous throughout the width of the planter.

The planting devices are two in number, arranged side by side between the wheels 12—12. The main parts of the planting mechanism include a pair of seed cans 15—15 each having downwardly extending spouts 16—16 arranged to deposit the seeds behind shovel openers 17—17. Other details of these mechanisms need not be described, as they may be of any well known construction, driven from the wheels 12—12 and arranged to drop seeds automatically at spaced intervals.

Each of said planting mechanisms are preceded by bottoms or sweeps 20, these sweeps being mounted on beams 21—21 arranged for vertical movement with respect to the main frame 10. In the form shown the beams are provided with racks 22—22 engaged by segment gears 23—23 carried on shafts 23ª, 23ª and each independently rocked by levers 24—24, the arrangement being such that the beams 21—21 may be moved vertically to raise or lower the bottoms 20—20 while maintaining substantially the same angle of said bottoms with respect to the ground.

Referring now more specifically to the parts of the main frame 10, each of the planting mechanisms and their associate sweeps are carried by longitudinally extending frame members 25—25 and connected frame members 26—26 extending forwardly to a cross bar 27. Transversely extending connecting members 28 and 29 join adjacent parts of frame members 25—25 at the front and rear end respectively of the frame. A seat 30 is mounted at the rear end of the main frame, in the form shown, being connected by a support 31 to the rearmost transverse frame member 29. A pair of parallel angle members 32—32 are connected to the transverse frame member 27 and extend forwardly and rearwardly thereof, the rearward ends being connected to the cross bar 28 and the forward ends having a pivotal bearing member 35 secured therebetween and forming a support for a vertically disposed shaft 36 of the tongue truck. In the form shown the tongue truck consists of a shaft 36, this shaft being offset laterally adjacent its lower end as shown in Figure 1, and provided with a horizontally disposed stub axle 37 upon which is rotatably mounted wheel 38. It will be understood that any equivalent wheeled structure may be used for this purpose. Adjustment of the height of the frame may be provided by means of vertically adjustable thrust bearing collars 35$^a$, 35$^a$ on shaft 36 and engaging bearing member 35. A pair of supports 39—39 extend from the cross bar 27 to the uper end of the bearing support 35 to reinforce the latter and maintain it in desired vertical position as shown.

The evener bar 40 is pivotally mounted centrally of the frame, and preferably adjacent the cross bar 27. In the form shown the pivotal connection consists of a pin 41 extending through the cross bar 27 and connected at its lower end with an auxiliary supporting bar 42 extending rearwardly underneath the evener 40 and upwardly into engagement with the longitudinal bars 32—32, as best shown in Figure 2.

It will be understood, of course, that the evener bar extends a considerable distance beyond the wheels 12—12 in both directions, this evener bar providing the usual draft devices such as equalizers, for accommodating four or more horses. Details of such equalizer devices connected with the evener need not be shown as their arrangement is well understood and forms no part of the present invention.

The tongue or pole 45 extends forwardly at the tongue truck but in the form shown is connected to the main frame 10 through the medium of lateral and rearwardly extending yoke members 46—46 and 47—47 pivotally connected at their rear ends to a bracket 48 secured adjacent the extreme ends of the cross members 27. This arrangement permits vertical swinging movement of the tongue 45 in the usual manner, although it will be noted that the tongue yoke is connected directly to the cross bar 27 of the main frame at points on opposite sides of and independent of the tongue truck connections.

From the above description it will be seen that the type of planter to which my invention is applied differs from many ordinary devices of planters in that the sweeps 20—20 are arranged forwardly of the axes of the supporting wheels 12. This arrangement has proved to have several advantages over planters in which the sweeps or plows are arranged behind the axis of the supporting wheels. However, in this general arrangement it will be observed that a part of the weight including the evener bar and the draft on the sweeps is carried by the forward end of the frame and heretofore this weight, as well as the weight of the tongue has been carried by the horses. In my improved form of planter herein disclosed, the tongue truck relieves the horses of the weight of the elements mentioned, making it much easier for the horses, and also holding the evener up so that it does not interfere with the horses when they are turning.

It will also be understood that the arrangement of the plows or sweeps 20 in spaced relation in front of the supporting wheel axes introduces a tendency to unsteadiness in following substantially straight-line rows, this unsteadiness being somewhat more noticeable than in planters in which the plows are arranged rearwardly of, or trailing the side supporting wheels.

I find that the provision of a fore-carriage arranged centrally and forwardly of the sweeps as herein disclosed overcomes this tendency of unsteadiness, making it possible to readily maintain the planter in the desired straight lines.

A further steadying effect is provided by the arrangement of the pivotal connection of the tongue or pole 45 direct to opposite sides of the frame and independent of the tongue truck.

Furthermore, these pivotal points of connection of the pole of the main frame is rearward of the pivotal support of the tongue truck, being immediately adjacent the pivotal support of the evener bar 40 at the transverse frame member 27. This construction affords a combination of tongue and frame which is substantially rigid in a longitudinal direction so that the main frame is guided by the pole independently of the pivotal connection of the tongue truck to the frame.

I claim:

1. In a two-row planter a frame provided with a pair of ground wheels, an evener bar pivotally connected with said frame near the forward end thereof, a tongue truck pivotally connected centrally of the forward end of said frame and forwardly of said evener bar, and a pole having yoked rear end members pivotally connected to said frame at opposite sides and rearwardly of the point of pivotal connection of said tongue truck and said frame.

2. In a two-row planter, a substantially rectangular frame member including a transverse bar at the front end thereof, a pair of supporting wheels at opposite sides of said frame member and adjacent the rear end thereof, a tongue pivotally connected to said transverse bar at widely-spaced points, a centrally disposed tongue truck pivotally connected to a supporting member extending forwardly of said transverse bar, and an evener bar connected centrally of said frame and rearwardly of said tongue truck.

3. In a two-row planter, a substantially rectangular frame including a transverse bar at the front end thereof, a pair of supporting wheels at opposite sides of said frame, a tongue pivotally connected to said transverse bar at widely-spaced points, a centrally disposed tongue truck pivotally connected to a supporting member extending forwardly of said transverse bar, and an evener bar connected centrally of said frame and rearwardly of said tongue truck.

4. In a two-row planter, the combination of a frame provided with a pair of ground wheels positioned laterally thereof, and a centrally disposed forward extension, an evener bar pivotally connected to said extension rearwardly of its forward end, a tongue truck pivotally mounted at the forward end of said extension forwardly of said evener bar and adapted to turn freely about a vertical axis, and a tongue pivotally connected with said frame at points disposed rearwardly and on opposite sides of said tongue truck.

5. In a two-row planter, the combination of a wheeled frame having a centrally disposed forward extension, a tongue truck mounted at the forward end of said extension, a tongue having a yoke at its rear end embracing the forward end of said extension and having pivotal connection with said frame rearwardly of and on opposite sides of said tongue truck mounting, and an evener bar pivotally connected with said frame.

Signed at Rock Island this 8th day of June, 1925.

LEE H. KAUPKE.